(12) United States Patent
Cabezas et al.

(10) Patent No.: US 8,112,674 B2
(45) Date of Patent: Feb. 7, 2012

(54) DEVICE ACTIVITY TRIGGERED DEVICE DIAGNOSTICS

(75) Inventors: Rafael Graniello Cabezas, Austin, TX (US); Brandon Dale Nelson, Round Rock, TX (US); Daniel Patrick Thomas, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 199 days.

(21) Appl. No.: 12/416,384

(22) Filed: Apr. 1, 2009

(65) Prior Publication Data

US 2010/0257405 A1     Oct. 7, 2010

(51) Int. Cl.
  *G06F 11/00* (2006.01)
  *G06F 11/22* (2006.01)
(52) U.S. Cl. ............. 714/44; 714/25; 714/43; 714/47.1
(58) Field of Classification Search .................. 714/44, 714/47, 47.1, 47.2, 47.3, 55, 25
  See application file for complete search history.

(56) References Cited

U.S. PATENT DOCUMENTS

| | | | |
|---|---|---|---|
| 6,161,201 A * | 12/2000 | Payne et al. ................ 714/43 |
| 6,892,321 B2 | 5/2005 | Chen | |
| 7,036,129 B1 * | 4/2006 | Korhonen ................ 719/321 |
| 7,039,738 B2 | 5/2006 | Plummer et al. | |
| 7,219,258 B2 | 5/2007 | LeVangia et al. | |
| 2003/0149546 A1 * | 8/2003 | Kim ................ 702/183 |
| 2004/0230861 A1 | 11/2004 | Bailey et al. | |
| 2005/0120329 A1 | 6/2005 | Gafter et al. | |
| 2006/0010347 A1 * | 1/2006 | Sugihara ................ 714/30 |
| 2009/0044044 A1 * | 2/2009 | Harter et al. ................ 714/6 |

OTHER PUBLICATIONS

IBM Redbooks, "pSeries—Enhanced Error Handling for PCI Adapters (EEH)", May 7, 2003, US.
U.S. Appl. No. 12/027,363, filed Feb. 7, 2009, Cabezas, et al.

* cited by examiner

*Primary Examiner* — Joseph Schell
(74) *Attorney, Agent, or Firm* — Mitch Harris, Atty at Law, LLC; Andrew M. Harris; Matthew W. Baca

(57) ABSTRACT

A diagnostic control methodology provides reduced disruption of device operation when performing diagnostics on devices within a computer system. A diagnostic application notifies a device driver that controls a particular device that diagnostics should be performed during a period of low activity on the device. In response to receiving the notification, the device driver waits for a time of low activity and either notifies the application to unload the device driver and load a diagnostic device driver, or enters a diagnostic mode directly if such operation is supported by the functional device driver. A timeout duration can be specified, and may be set by the notification, so that the diagnostics will be performed within the timeout period even if a time of low activity has not occurred by the expiration of the timeout.

12 Claims, 4 Drawing Sheets

DEVICE ACTIVITY TRIGGERED DEVICE DIAGNOSTICS

CROSS-REFERENCE TO RELATED PATENT APPLICATION

The present U.S. Patent Application is related to co-pending U.S. patent application Ser. No. 12/027,363 entitled "METHOD AND APPARATUS FOR DEVICE DRIVER STATE STORAGE DURING DIAGNOSTIC PHASE", filed on Feb. 7, 2009 by the same inventors and assigned to the same Assignee. The disclosure of the above-referenced U.S. Patent Application is incorporated herein by reference.

BACKGROUND OF THE INVENTION

1. Field of the Invention

The present invention relates to diagnostic programs and techniques within a computer system, and more particularly to diagnostic techniques in which execution of the diagnostics is triggered during low activity of the device.

2. Description of the Related Art

Present-day computer systems typically use a distributed software model for device control, in which device drivers, which may be loaded into system memory or alternatively located in device memory, provide control of the various devices within the system, e.g., peripheral devices and system hardware components. Further, with hierarchical interconnects, large numbers of device drivers are typically loaded, as each level of the hierarchy will typically have at least one device driver, and in some cases, each device will have an associated device driver image.

In order to perform adequate system diagnostics, at least the system hardware devices, and desirably the peripheral devices, must be tested. However, in order to perform the diagnostics, activity on the devices must typically cease. That is, the ordinary operation of the device must be halted and diagnostic operations commenced. Further, in some device driver configurations having a diagnostic device driver separate from the driver that provides ordinary operation control, the ordinary device driver must be unloaded, or at least placed in a state that makes it possible for the diagnostic driver to access the device, and the device state must generally be preserved through the diagnostic process. Otherwise, diagnostics could only be performed at system startup and shutdown.

However, performing diagnostics interrupts operation of a system and its devices, and the state of the devices can be very large during times of high activity, requiring significant storage and transfer time. The time period during which ordinary operation is disrupted is also not trivial. A significant wait time may be experienced during loading and unloading of drivers and diagnostic applications and some diagnostics, such as exhaustive memory tests on large peripheral device buffers may require long execution times.

Further, it is desirable to perform diagnostics in parallel, as parallel operation provides faster results and should minimize system impact as far as the total time period that the system, or portions thereof, is undergoing diagnostic evaluation. However, since the devices must typically cease their ordinary functions during the diagnostic period, parallel diagnostic operation is typically not performed due to the larger impact, in general, of the device downtime required to perform the diagnostics and also due to the unpredictability of system demands that will raise activity levels across multiple devices. Therefore, diagnostics are typically performed serially, and typically under manual control, so that a user controlling the diagnostics can determine whether or not the diagnostics can be performed in view of system traffic, and can ensure that system resources will be adequate to service requirements during the diagnostics. For example, in a server array, diagnostics may be run serially on the network adapters in one server, and re-routed traffic will only increase by the traffic associated with one adapter. Conversely, if all of the network adapters one a server are run in parallel, the re-routed traffic could reach the maximum traffic allocated to the server.

Therefore, it would be desirable to minimize the impact of performing device diagnostics on actual device operation, as well as the impact of the device activity on performing the diagnostics. It would further be desirable to provide a diagnostic scheme in which device diagnostics can be performed in parallel within a system without severely impacting system performance.

BRIEF SUMMARY OF THE INVENTION

The present invention provides a computer-performed method, a computer system and computer program products for performing diagnostics on a device. The computer program products include device drivers that control the device and diagnostic applications that control initiation of the diagnostics.

A device driver that controls ordinary functional operation of the device receives a notification from the diagnostic application that diagnostics should be performed when the device is experiencing a time of low activity. When a period of low activity is encountered, the device driver either notifies the diagnostic application, so that the diagnostic application can unload the device driver and load a diagnostic device driver, or the device driver can enter a diagnostic mode if such a mode is supported in the functional device driver. The diagnostics are performed and a result is returned to the diagnostic application.

A predetermined time period can be used to initiate the diagnostics irrespective of whether the time of low activity is detected, essentially "forcing" the diagnostics to occur within the predetermined time period. The value of the predetermined time period may be communicated to the device driver by the diagnostic application along with the notification that the diagnostics should be performed during a time of low activity on the device.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

DETAILED DESCRIPTION OF THE INVENTION

The present invention is directed to techniques for performing diagnostics on devices, while reducing the impact of those diagnostics on system performance and down-time. A device driver associated with a particular device is notified by a diagnostic application, that diagnostics should be performed during a time of low activity on the device. When a time of low activity is detected, diagnostics are initiated on the device by either notifying the diagnostic application to unload the functional device driver and replace it with a diagnostic device driver, or if the device driver supports both functional operation and diagnostics, the device driver may enter the diagnostic mode directly.

Figure 1:
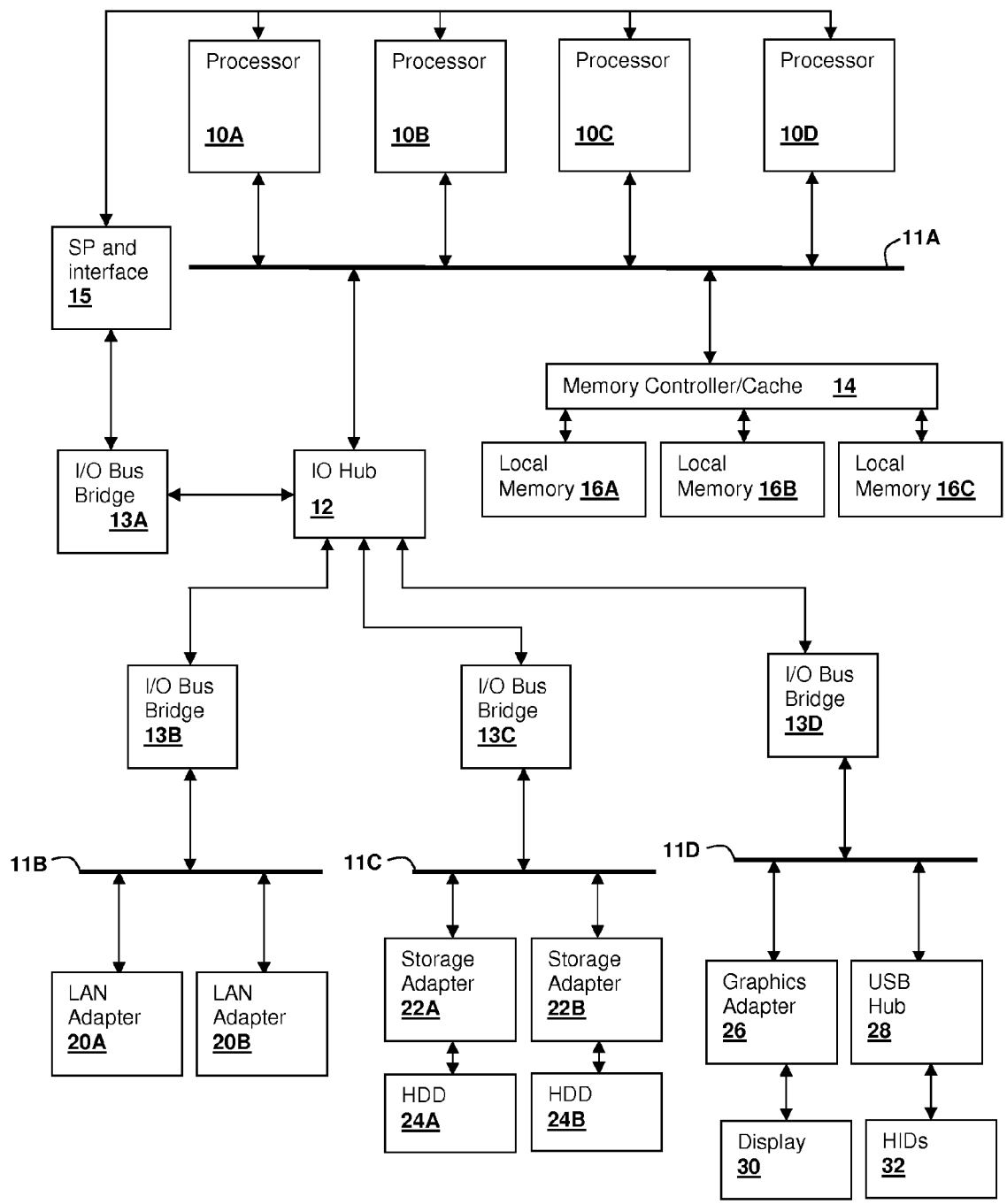
FIG. 1 is a block diagram of a computer system in which the present invention is practiced.

Referring now to FIG. 1, a computer system in which an embodiment of the present invention is practiced, is illustrated. The illustrated multi-processor server computer system is only exemplary of a computer system in which device diagnostics can be performed, and it is understood that the present invention is applicable to a wide range of computer system types, including uni-processor personal computers. A plurality of processors 10A-10D are coupled to a high speed local bus 11A that provides connectivity to a memory controller and external cache 14 that couples local bus 11A to local memories 16A-16C. Local bus 11A is also coupled to an I/O hub 12 that connects the processing sub-system including processors 10A-10D and local memories 16A-16C to other subsystems within a rack. A service processor within the processing sub-system is also coupled to I/O hub 12 by a I/O bus bridge 13A, such as a peripheral component interconnect (PCI) bus bridge. A service processor (SP) and associated mailbox interface 15 are coupled to each of processors 10A-10D via a serial interface such as a Joint Test Action Group (JTAG) interface and provide startup sequencing and other maintenance tasks within the computer system.

A network I/O subsystem is provided by LAN adapters 20A-20B which are coupled to I/O hub 12 by I/O bus bridge 13B and I/O bus 11B. Similarly, a storage I/O subsystem including storage adapters 22A-22B is coupled to I/O hub 12 by I/O bus bridge 13C and I/O bus 11C, and coupled hard disc drives (HDDs) 24A-24B to the computer system. Control of the computer system can be provided via directly connected user interface I/O subsystem such as that illustrated by graphics adapter 26 and USB Hub 28, which couple display 30 and human input devices (HIDs) 32 to the computer system via I/O bus 11D and corresponding I/O bus bridge 13D. Control of the computer system can additionally or alternatively be provided from another computer coupled to the computer system of FIG. 1 though one of LAN adapters 20A-20B or another suitable interface coupled to processors 10A-10D.

For control of the devices within the computer system of FIG. 1, device drivers are provided that manage hardware resources, perform control tasks, and in the present invention assist in performing diagnostics during a time of low activity on a corresponding device. In general, a large number of device drivers may be present in a computer operating system image and associated with various devices, for example each of I/O bus bridges 13A-13D may be operated by a corresponding device driver image, each of LAN adapters 20A-20B and each of storage adapters 22A-22B. The above list of devices that may be associated with individual device driver images is exemplary and not exhaustive, as device drivers may be present for any of the blocks shown in FIG. 1, each of which correspond to a device, and each of which may have diagnostics controlled according to the techniques of the present invention.

The present invention is particularly suited to performing diagnostics on devices through which large volumes of critical traffic are present and in which performing diagnostics on the devices will disrupt that traffic to some degree. In such instances, performing diagnostics impacts system performance and may require that at least the device, and possibly an entire subsystem or the system itself be off-line during the diagnostics. The present invention mitigates such reduction in system performance by notifying the functional device driver, that is, the device driver that operates the device during ordinary functional operation of the device, that diagnostics should be performed on the device. The device driver then determines when to perform the diagnostics by detecting a period of low activity on the device. However, the present invention may be applied to any device that is managed by a device driver, and even though some devices may not critically impact system performance during diagnostics intervals, the interruption of functionality may be a nuisance. For example if a request to perform diagnostics on HIDs 32 is received, the diagnostics could be performed at any time without affecting the throughput of the server system depicted in FIG. 1, but such diagnostics might interfere with a user attempting to operate a program user interface using HIDs 32. By detecting that a user has not been recently activating any of HIDs 32, which is an example of a period of low activity, HIDs 32 can be diagnosed without interfering with a user.

Figure 2A:
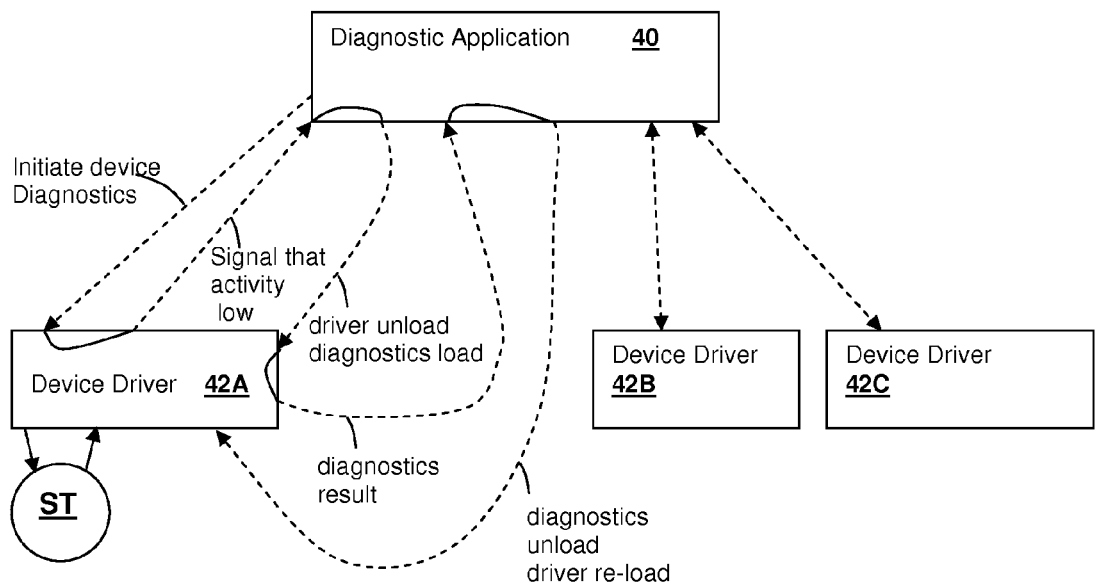
FIGS. 2A and 2B depict interactions between and organizations of software modules in accordance with different embodiments of the invention.

Referring now to FIG. 2A, an organization and interaction of software modules is illustrated in accordance with an embodiment of the invention. The illustrated modules may be loaded within any or all of local memories 16A-16D in the computer system of FIG. 1 and include program instructions that may be executed by any or all of processors 10A-10D for carrying out one or more methods in accordance with embodiments of the invention. A device driver image 42A receives a notification from a diagnostics application 40 that diagnostics should be performed on a device associated with device driver image 42A, such that the diagnostics should be performed during a time of low activity on the device. The notification can be made through an input/output control message (IOCTL), flags in a shared image, or any other suitable signaling technique. The device driver waits until the activity on the device is below a threshold level, e.g., packets not received on LAN adapter 20A for a predetermined number of seconds, or a packet reception and/or transmission rate is below a predetermined rate. Upon determining that the activity is below a threshold, the device driver signals diagnostic application 40 that a time of low activity has been detected. In response, diagnostic application 40 causes device driver 42A to be unloaded or otherwise disabled and causes a diagnostic driver to be loaded. Device driver 42A may disable itself or automatically unload prior to sending the notification to diagnostic application 40, so that diagnostic application 40 need only load a diagnostic driver. Alternatively, device driver 42A may be a single image that supports both functional device operation and diagnostic operation by entering a diagnostic mode. Prior to unloading device driver 42A or entering a diagnostic mode, a state ST device driver 42A is saved in memory (e.g., one of local memories 16A-16D), so that state ST may be restored when device driver 42A is re-loaded or placed again in a functional mode.

Once device driver image 42A contains a diagnostic driver, or is in a diagnostic mode, diagnostics are performed on the associated device(s) and a diagnostics result is returned to diagnostic application 40. Upon receiving the diagnostics result, diagnostic application causes device driver image 42A to be replaced with a functional device driver or to re-enter an operational mode, depending on whether a single device driver is used to implement device driver image 42A. Further, it is understood that device driver image 42A, may represent two concurrently loaded images if the functional device driver is merely disabled and a diagnostic device driver is contemporaneously loaded. Also, it is understood that a diagnostic device driver image loaded in the place of a functional device driver will likely not be loaded into the same memory address range. Therefore, the illustrated organization is only one example of a software organization and the present invention may be applied to many other organizations of device drivers and programs that initiate diagnostics. Finally, while the device drivers as illustrated are stored within at least one of local memories 16A-16D, it is understood that device drivers and diagnostics in accordance with embodiments of the invention may also include or consist of program instructions that are loaded into a storage within a peripheral adapter such as LAN adapters 20A-20B or storage adapters 22A-22B of FIG. 1.

Diagnostic application 40 is representative of one form of diagnostic control that may be present within a computer system such as the computer system of FIG. 1 and is generally a program that is executed by a system administrator or field service technician to perform preventative maintenance or troubleshooting on one or more devices that are controlled by device drivers such as device drivers 42A-42C. However, diagnostic application 40 may alternatively represent a built-in boot diagnostic, such as in a smaller personal computer system, or an operating system diagnostic that is automatically activated during boot, in response to detection of certain conditions, or any other form of diagnostic controlling program that initiates diagnostics on devices that are operated by device drivers.

Figure 2B:
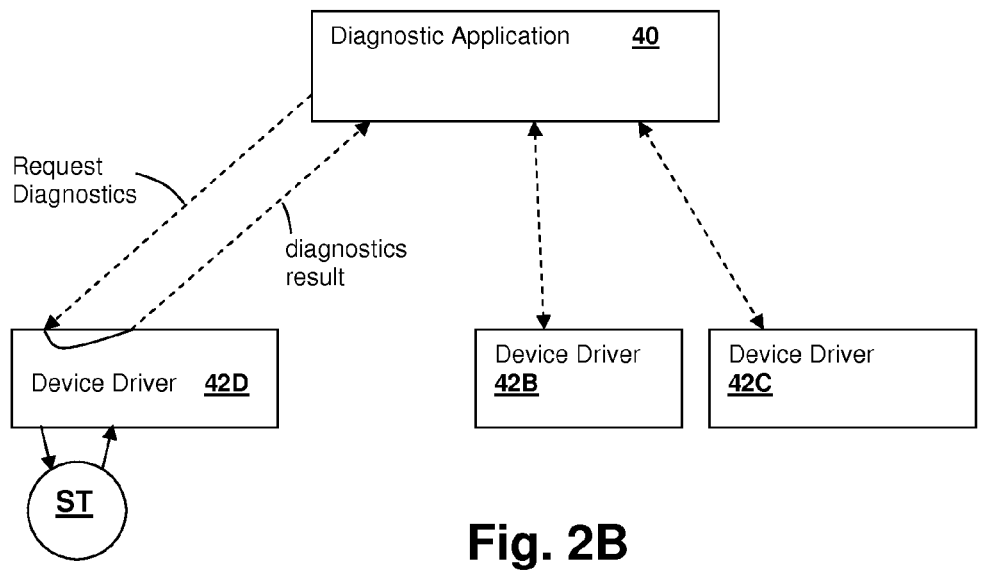

Referring now to FIG. 2B, an organization an interaction of software modules is illustrated in accordance with another embodiment of the invention. The illustrated organization is similar to that depicted in FIG. 2A, and therefore only differences in operation will be described below. Device driver image 42D illustrates a device driver that includes diagnostic tests, or is at least capable of loading its own set of diagnostics without intervention by diagnostic application 40. Diagnostic application 40 notifies device driver image 42D that diagnostics should be performed on an associated device and device driver image 42D waits for a time of low device activity saves state ST, performs the diagnostics and then returns the diagnostic result to diagnostic application. With respect to saving state ST both in the embodiment depicted in FIG. 2B and as described above with reference to FIG. 2A, it is understood that if a device driver image 42D is completely unloaded and replaced with a diagnostic application, then state ST will represent the entire state of device driver image 42D. However, if device driver image 42D is merely disabled, or placed in a diagnostic mode, it may only be necessary to save a driver state ST associated with the particular device for which diagnostics are being performed. Further, if the image of a functional device driver is maintained in its entirety and merely disabled, then state ST may not need to be saved at all. Details of saving/restoring device states and loading and unloading of device drivers are provided in the above-incorporated U.S. Patent Application "METHOD AND APPARATUS FOR DEVICE DRIVER STATE STORAGE DURING DIAGNOSTIC PHASE."

In accordance with an embodiment of the present invention, a time-out period may be set within device driver image 42A and/or 42D or may be provided in the notification from diagnostic application 40. The time-out period is used to trigger diagnostics even if a time of low activity is not detected within a time period set by the duration of the time-out. Diagnostic application 40 may provide configuration of the duration so that diagnostics can be commanded within a certain period of time by an operator.

Figure 3:
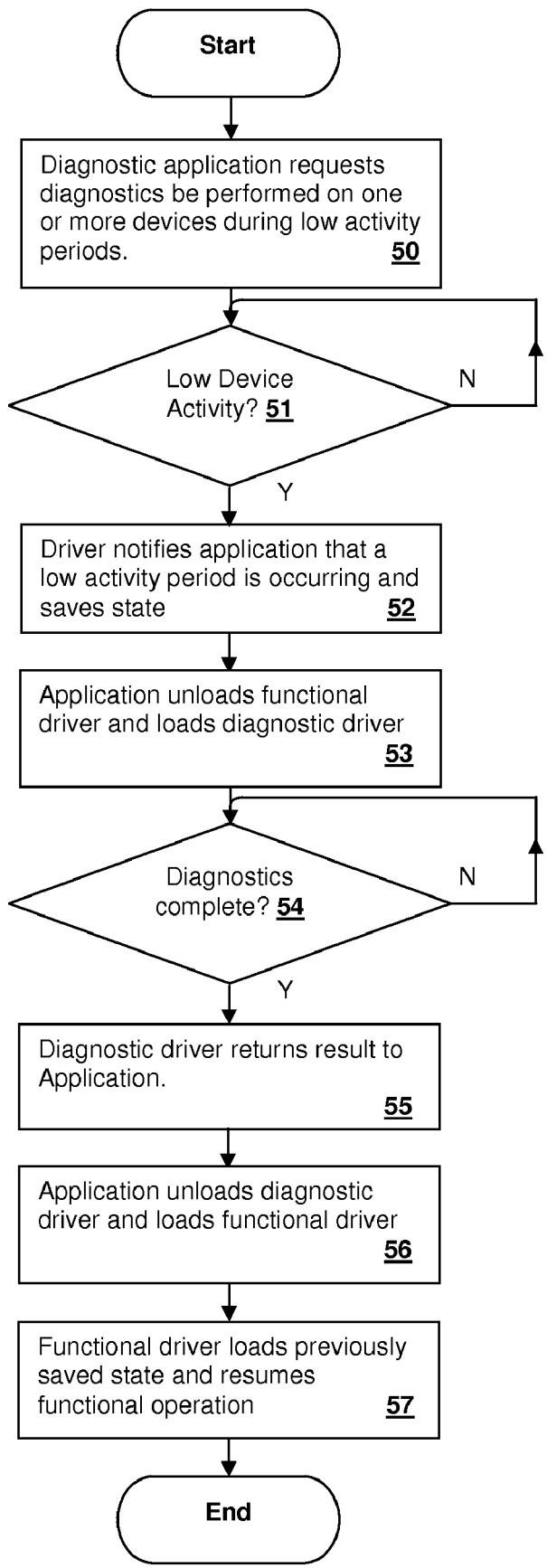
FIG. 3 is a flowchart depicting a method in accordance with an embodiment of the invention.

Referring now to FIG. 3, a method according to an embodiment of the invention is depicted in a flowchart. A diagnostic application requests that diagnostics be performed on one or more devices during low activity periods (step 50). Until low activity is detected (decision 51), the driver waits. When a time of low activity is detected (decision 51), the driver notifies the application that a low activity period is occurring and also the driver saves its state (step 52). In response, the application unloads the functional driver and loads the diagnostic driver, if needed (step 53). Diagnostics are performed, and when complete (decision 54), the diagnostic driver returns the diagnostics result to the application (step 55). The application then unloads the diagnostic driver and re-loads the functional driver (step 56). Finally, the functional driver loads the previously-saved state and resumes functional operation (step 57).

Figure 4:
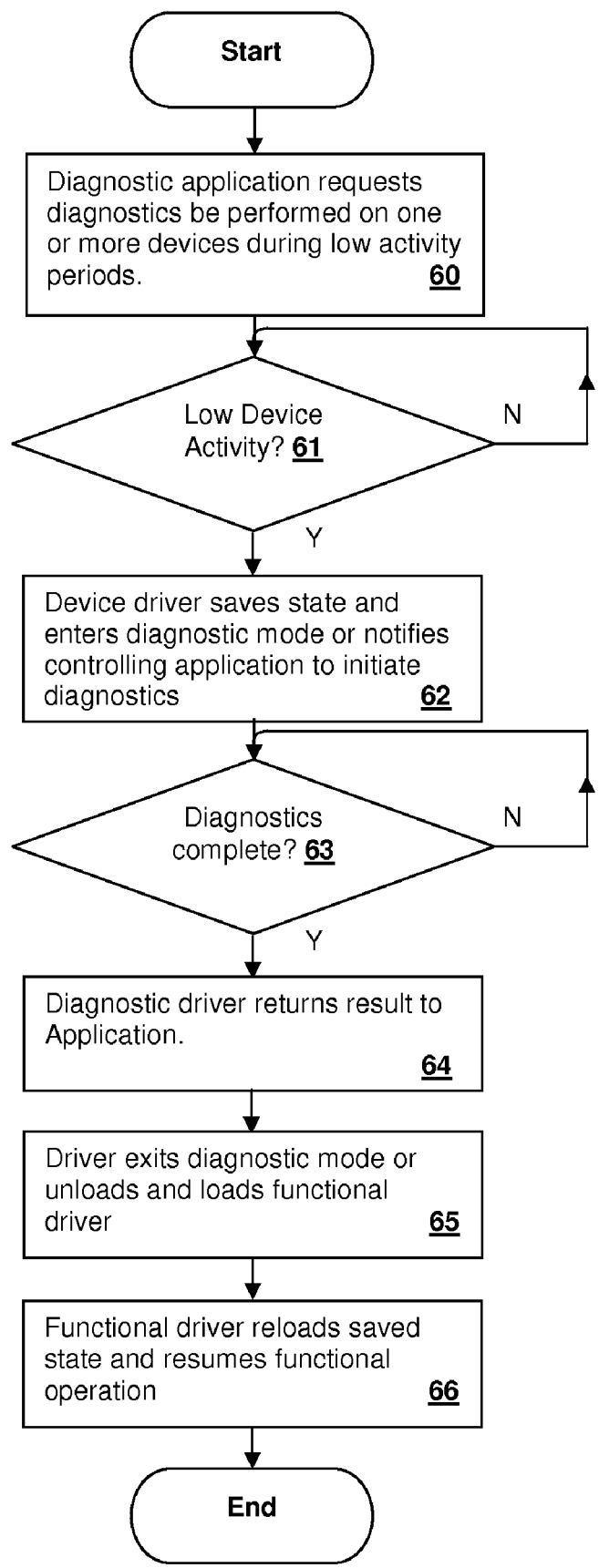
FIG. 4 is a flowchart depicting a method in accordance with another embodiment of the invention.

Referring now to FIG. 4, a method according to another embodiment of the invention is depicted in a flowchart. A diagnostic application requests that diagnostics be performed on one or more devices during low activity periods (step 60). Until low activity is detected (decision 61), the driver waits. When a time of low activity is detected (decision 61), the driver saves its state and enters a diagnostic mode or notifies the controlling application to perform diagnostics, which will unload the functional driver and load a diagnostic driver (step 62). Diagnostics are performed, and when complete (decision 63), the diagnostic driver returns the diagnostics result to the application (step 64). The diagnostic driver then exits diagnostic mode or unloads and re-loads the functional driver (step 65). Finally, the functional driver loads the previously-saved state and resumes functional operation (step 66).

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A computer-performed method for performing device diagnostics within a computer system, the method comprising:
    notifying a device driver loaded within the computer system that the device diagnostics should be performed during a time of low activity of a particular device associated with the device diagnostics and the device driver;
    determining, within the device driver, that an activity level of the particular device is below a threshold value;
    responsive to determining that the activity level of the particular device is below the threshold value, ceasing ordinary operation of the device and executing the device diagnostics; and
    responsive to determining that the activity level of the particular device is not below the threshold value and that a predetermined time period has elapsed, ceasing ordinary operation of the device and executing the device diagnostics, wherein the notifying further provides a duration of the predetermined time period to the device driver.

2. The computer-performed method of claim 1, wherein the ceasing ordinary operation of the device comprises saving a state of the device and unloading the device driver, and wherein the executing the device diagnostics comprises loading a diagnostic device driver.

3. The computer-performed method of claim 2, wherein the notifying is performed by a diagnostic application executing within the computer system that notifies the device driver to signal the diagnostic application when the determining determines that the activity level of the particular device is below the threshold value, and wherein the application in response to receiving a signal from the device driver, commands the device driver to perform the saving of the state of the device, unloads the device driver, and loads the diagnostic device driver.

4. The computer-performed method of claim 1, wherein the directing is performed by a diagnostic application executing within the computer system that notifies the device driver to enter a diagnostic mode when the activity level of the particular device is below the threshold value.

5. A computer system comprising a processor for executing program instructions coupled to a memory for executing the program instructions, wherein program instructions comprise program instructions for controlling device diagnostics, and wherein the program instructions comprise program instructions for:
   notifying a device driver loaded within the computer system that the device diagnostics should be performed during a time of low activity of a particular device associated with the device diagnostics and the device driver;
   determining, within the device driver, that an activity level of the particular device is below a threshold value;
   responsive to determining that the activity level of the particular device is below the threshold value, ceasing ordinary operation of the device and executing the device diagnostics; and
   ceasing ordinary operation of the device and executing the device diagnostics in response to the program instructions for determining having determined that the activity level of the particular device is not below the threshold value and that a predetermined time period has elapsed, wherein the program instructions for notifying further provide a duration of the predetermined time period to the device driver.

6. The computer system of claim 5, wherein the program instructions for ceasing ordinary operation of the device comprises program instructions for saving a state of the device and unloading the device driver, and wherein the program instructions for executing the device diagnostics comprises program instructions for loading a diagnostic device driver.

7. The computer system of claim 6, wherein the program instructions for notifying are program instructions of a diagnostic application executing within the computer system that notifies the device driver to signal the diagnostic application when the program instructions for determining have determined that the activity level of the particular device is below the threshold value, and wherein the application in response to receiving a signal from the device driver, commands the device driver to perform the saving of the state of the device, unloads the device driver, and loads the diagnostic device driver.

8. The computer system of claim 5, wherein the program instructions for notifying are program instructions of a diagnostic application executing within the computer system that notifies the device driver to enter a diagnostic mode when the activity level of the particular device is below the threshold value.

9. A computer program product comprising a computer-readable storage media storing program instructions for execution by a processor within a general-purpose computer system, wherein the program instructions are program instructions of a diagnostic application that controls device diagnostics within the computer system, the program instructions comprising program instructions for:
   notifying a device driver loaded within the computer system that the device diagnostics should be performed during a time of low activity of a particular device associated with the device diagnostics and the device driver; and
   receiving a result of the device diagnostics from the particular device, and wherein the notifying further specifies a duration of a predetermined time period that the device driver should wait for the time of low activity before performing the device diagnostics irrespective of whether the time of low activity occurs, and wherein the program instructions for notifying further provide a duration of the predetermined time period to the device driver.

10. The computer program product of claim 9, further comprising program instructions for:
   receiving a notification of the time of low activity of the particular device from the device driver; and
   initiating the device diagnostics on the device.

11. The computer program product of claim 10, wherein the program instructions for initiating comprises program instructions for:
   unloading the device driver; and
   loading a diagnostic device driver, and wherein the receiving receives the result of the device diagnostics from the diagnostic device driver.

12. The computer program product of claim 10, wherein the program instructions for initiating comprises program instructions for commanding the device driver to enter a diagnostic mode, and wherein the receiving receives the result of the device diagnostics from the device driver.

* * * * *